(12) United States Patent
Schlachter (10) Patent No.: US 11,540,907 B2
(45) Date of Patent: Jan. 3, 2023

(54) METHOD FOR PRODUCING A DENTAL OBJECT

(71) Applicant: Amann Girrbach AG, Koblach (AT)

(72) Inventor: Benjamin Schlachter, Lustenau (AT)

(73) Assignee: Amann Girrbach AG, Koblach (AT)

( * ) Notice: Subject to any disclaimer, the term of this patent is extended or adjusted under 35 U.S.C. 154(b) by 1036 days.

(21) Appl. No.: 16/063,906

(22) PCT Filed: Nov. 15, 2016

(86) PCT No.: PCT/EP2016/077670
§ 371 (c)(1),
(2) Date: Jun. 19, 2018

(87) PCT Pub. No.: WO2017/129282
PCT Pub. Date: Aug. 3, 2017

(65) Prior Publication Data
US 2018/0360576 A1     Dec. 20, 2018

(30) Foreign Application Priority Data

Jan. 29, 2016  (EP) ..................................... 16153369

(51) Int. Cl.
*B24B 49/00* (2012.01)
*A61C 13/00* (2006.01)
*A61C 13/083* (2006.01)

(52) U.S. Cl.
CPC ...... *A61C 13/0004* (2013.01); *A61C 13/0006* (2013.01); *A61C 13/0022* (2013.01); *A61C 13/083* (2013.01)

(58) Field of Classification Search
CPC ............ A61C 13/0004; A61C 13/0006; A61C 13/0022; A61C 13/09; A61C 13/083
(Continued)

(56) References Cited

U.S. PATENT DOCUMENTS 4,936,052 A * 6/1990 Nagase .................. B24B 7/005
451/127
7,774,080 B2 8/2010 Holzner et al.
(Continued)

FOREIGN PATENT DOCUMENTS

CN   103561675   2/2014
CN   103687569   3/2014
(Continued)

*Primary Examiner* — Joseph J Hail
*Assistant Examiner* — Shantese L McDonald
(74) *Attorney, Agent, or Firm* — Volpe Koenig (57) ABSTRACT

A method for the production of a dental object (1) by grinding a blank (2) made of ceramic or a ceramic-plastic composite material, wherein, for the production of a preform (3) having an outer contour (4) that differs from a final outer contour (5) of the dental object (1) to be produced, a grinding channel (8) is machined into the blank (2) or into a pre-preform (9) already made from the blank (2), in at least one grinding process using a grinding tool (6) of a grinding device (7), wherein the outer contour (4) of the preform (3) is formed with the grinding channel (8) on one edge (10) thereof, and on the edge (11) of the grinding channel (8) opposing the outer contour (4) of the preform (3), at least one remaining piece (12) is removed from the blank (2) or from the pre-preform (9) at least in sections.

11 Claims, 6 Drawing Sheets

(58) Field of Classification Search
USPC .................................................. 451/5, 10, 58
See application file for complete search history.

(56) References Cited

U.S. PATENT DOCUMENTS

| | | | |
|---|---|---|---|
| 8,651,860 B2 | 2/2014 | Kwon | |
| 9,820,833 B2 | 11/2017 | Noack | |
| 11,045,291 B2* | 6/2021 | Leeson | ................... B28B 11/08 |
| 2009/0155007 A1 | 6/2009 | Liu | |
| 2009/0181346 A1 | 7/2009 | Orth | |
| 2010/0058588 A1 | 3/2010 | Heinz et al. | |
| 2012/0177456 A1* | 7/2012 | Jung | .................. A61C 13/0004 |
| | | | 408/1 R |
| 2015/0097305 A1* | 4/2015 | Hufschmied | ......... B23C 5/1009 |
| | | | 264/16 |
| 2017/0027673 A1 | 2/2017 | Beom et al. | |
| 2018/0360576 A1* | 12/2018 | Schlachter | ........... A61C 13/083 |

FOREIGN PATENT DOCUMENTS

| | | | | |
|---|---|---|---|---|
| CN | 105188597 | | 12/2015 | |
| EP | 2692311 | | 2/2014 | |
| JP | 2004001111 | * | 1/2004 | ............. B23B 51/00 |
| JP | 2004001111 | | 1/2008 | |
| JP | 2011194119 | | 10/2011 | |
| JP | 2012192467 | | 10/2012 | |
| WO | 03032861 | | 4/2003 | |

* cited by examiner

METHOD FOR PRODUCING A DENTAL OBJECT

BACKGROUND

The present invention relates to a method for producing a dental object by grinding a blank made of ceramic or of a ceramic-plastic composite material.

Due to their hardness, blanks made of ceramic or of a ceramic-plastic composite material are often unable to be milled in order to produce dental objects. The dental object can often be machined from such blanks exclusively by grinding. For this purpose, in the prior art, the blank is ground down in regions. Except for any support webs, or for wall regions of the blank that are at a distance from the dental object, it is generally the case that the entire material of the blank not ultimately forming part of the dental object is converted to grinding dust through line-by-line grinding work. This procedure is very time-consuming. Moreover, it generates a high degree of wear on the grinding tool used for the grinding work.

SUMMARY

The objective addressed by the invention is to improve methods of the abovementioned type such that they can be produced more quickly and with less wear on the grinding tool.

To achieve this objective, a method is provided with one or more features of the invention.

In other words, provision is thus made that, by machining the grinding channel into the blank or into an already machined pre-preform, whole residual pieces are separated from the blank or from the pre-preform, in order initially to create a preform as it were as an intermediate product prior to the production of the final outer contour of the dental object to be produced. The outer contour of this preform does not yet correspond, at least not as a whole, to the final outer contour of the dental object to be produced. Therefore, in this approach according to the invention, only the material into which the grinding channel is machined is converted to grinding dust. By the grinding channel, the residual pieces are separated as fairly large and still contiguous parts from the blank or from the pre-preform. This takes place substantially more quickly than the above-described approach known from the prior art, since the material of the blank that is not ultimately part of the dental object is not all ground off and converted to grinding dust. In addition to the advantage in terms of time saved, this approach also has the effect that the wear on the grinding tool is greatly reduced compared to the prior art. When carrying out the method according to the invention, the at least one residual piece is preferably separated completely from the blank or from the pre-preform. However, with the grinding channel, it is also possible in principle to create a partition line, e.g. in the form of a thinning or a predetermined breaking point, which then allows the at least one residual piece to be deliberately broken off from the blank or the pre-preform along the grinding channel. The separation of the residual piece, as set out in claim 1, can thus also be carried out as a partial separation.

In contrast to milling, which is always carried out with a defined cutting edge, grinding is a form of material-removal machining in which the grinding tool has a large number of geometrically undefined cutting edges, e.g. in the form of abrasive particles. These are brought into intermittent contact, mostly at high speed, with the material that is to be separated by grinding. During the grinding process, the numerous undefined cutting edges of the grinding tool separate only very small particles in the form of grinding dust, whereas milling and other types of machining such as drilling generally give rise to fairly large chips.

Machining the grinding channel into the blank or into the pre-preform is an expression signifying the formation of the grinding channel by grinding. The grinding channel is a partition line which is machined into the blank or into the pre-preform. When the grinding channel is formed completely, it completely separates the residual piece or the residual pieces from the blank and/or from the pre-preform. Provision is preferably made that the mutually opposite edges of the grinding channel, in the regions where both opposite edges of the grinding channel are formed, are at a constant distance from each other over the entire profile of the grinding channel.

In particularly preferred embodiments of the method according to the invention, provision is made that the penetration depth of the grinding tool into the blank or into the pre-preform during the machining of the grinding channel is set such that the grinding channel is formed in a single grinding process. In these embodiments, the at least one residual piece is thus separated from the blank or from the pre-preform in a single grinding process. However, other variants of the invention can also be provided in which the penetration depth of the grinding tool into the blank or into the pre-preform during the machining of the grinding channel is set such that the grinding channel is formed to its full depth, and therefore the residual piece is separated from the blank or from the pre-preform, in a small number of grinding processes, preferably at most five grinding processes. If more than one grinding process is needed, the grinding channel is initially formed as a groove-like or channel-like depression in the first grinding process or the first grinding processes. It is only with the final grinding process that the grinding channel becomes a partition line, preferably a complete partition line, which separates the residual piece from the blank and/or from the preform, preferably completely.

For the sake of completeness, it will be noted that not just one residual piece but several residual pieces can be separated from the blank or from the pre-preform by a single grinding channel, in order thereby to create the preform. Moreover, a residual piece does not have to form everywhere along the grinding channel on the side opposite the outer contour of the preform. Particularly if the grinding channel is made slightly wider and/or at the edge of the blank or of the pre-preform, regions may also be present at which no residual piece arises at all.

Preferably, the method according to the invention, for producing the final outer contour of the dental object that is to be produced, exclusively involves grinding. However, combinations of the invention with other work steps are also conceivable for machining the blank or the pre-preform.

The residual piece is a piece of the blank or of the pre-preform that is substantially larger than, preferably at least ten times larger than, the particle size of the grinding dust generated during the grinding. The particle size of the grinding dust during the grinding of ceramics or of ceramic-plastic composite materials generally has a diameter of 3 μm (micrometers) to 250 μm, often of 50 μm to 100 μm. The residual piece or the residual pieces can be a waste piece or waste pieces that are discarded. However, the residual pieces can also be so large that they can be used as a blank or pre-preform for the production of another dental object by a method according to the invention or also by another method.

The dental objects that can be produced by methods according to the invention can be dental prostheses in particular. These are products, e.g. artificial teeth, bridges and the like, that are intended to remain permanently in the mouth of the patient in order to replace or supplement the natural teeth that are no longer present or that are still present only in part. With methods according to the invention, however, it is also possible in particular to produce dental objects in the form of dental aids, e.g. for the production of dental prostheses, or in the form of temporary prostheses. These are products which are needed for producing a dental prosthesis or for fitting a dental prosthesis in the mouth of the patient or which are fitted only temporarily in the mouth of the patient, and which are not intended to remain permanently in the mouth of the patient.

As has already been stated above, the preform can be produced by the method according to the invention from a blank or also from a pre-preform. The outer contour of the preform differs, at least in certain regions, both from the final outer contour of the dental object ultimately to be produced and from the original outer contour of the blank or the outer contour of the pre-preform. As is conventionally understood in the general use of the word, the blank is, for example, a commercially available product which can have very different outer contours. Disk-shaped and plate-shaped blanks are known, and parallelepipedal, cuboid or other forms of blanks are also commercially available. A pre-preform is obtained from the blank by some type of machining step involving material removal. The pre-preform thus no longer has the same outer contour as the blank. Moreover, however, it still does not have the same outer contour as the preform. With the method according to the invention, it is possible to initially produce a preform and thereafter, preferably by further grinding, to generate the final outer contour of the dental object that is to be produced. However, the method according to the invention can also be applied iteratively in a number of steps. Thus, a preform initially produced according to the invention from a blank can be used, in a succeeding application of the method according to the invention, as a pre-preform for the production of a further preform. This process can be carried out several times in succession, with provision generally being made that the outer contour of the preform is at least one step more closely approximate to the final outer contour of the dental object that is to be produced than it is to the outer contour of the pre-preform from which the preform was obtained. For the sake of completeness, it will be noted that, in iterative production processes of this kind, not all method steps necessarily have to be carried out according to the invention. Pre-preforms can also be produced differently. For example, it would be conceivable to first of all saw a piece off from a blank in order thereby to produce a pre-preform, which is then machined by a method according to the invention in order to produce a preform.

In preferred embodiments according to the invention, provision is at any rate made that, after production of the preform, the final outer contour of the dental object to be produced is produced exclusively or at least also by further grinding of the preform. As has been stated, the final outer contour of the dental object to be produced can then be worked from the preform. It is equally possible for several steps to be carried out in succession, in which produced preforms are then worked as pre-preforms for the production of new preforms prior to the production of the final outer contour of the dental object that is to be produced. In simpler terms, the pre-preform could also be designated as a rough form or precursor form.

The materials to be machined by the invention are ceramic or ceramic-plastic composites which are generally characterized by a very high degree of hardness and often also by brittleness. The materials are particularly preferably so-called glass ceramics, lithium-disilicate ceramics, as sold for example under the trade names Ivoclar e.max and Vita Suprinity, or ceramic-plastic composites with similar physical properties. Material characteristics for preferred embodiments of such ceramics or ceramic-plastic composites are a fracture toughness K1c of less than or equal to 15 MPam$^{1/2}$ (megapascal per cubic meter) and/or a percentage elongation at break of less than or equal to 0.1% and/or final densities of less than or equal to 6.0 g/cm$^3$ (gram per cubic centimeter) and/or an elastic modulus of less than or equal to 120 GPa (gigapascal).

For a very quick and simple approach to the production according to the invention of the said preform, provision is made, in preferred embodiments of the method according to the invention, that the grinding tool is elongate in a direction of longitudinal extent and, during the entire grinding process for production of the grinding channel or during all of the grinding processes for production of the grinding channel, is arranged exclusively with its direction of longitudinal extent in orientations arranged parallel to each other. In other words, during the grinding process or all of the grinding processes for production of the grinding channel, the grinding tool is neither pivoted nor in any other way modified in terms of its angular position relative to the blank or to the pre-preform. In particular, by such an approach, an outer contour of the preform can be produced which, at least in sections, is the lateral surface of a generalized cylinder. Here, the terms generalized cylinder and lateral surface of such a generalized cylinder relate to the mathematical definition in the sense that the lateral surface of such a generalized cylinder is obtained by parallel displacement of a straight line or generatrix along a curve, which can also be designated as a guide curve. The lateral surface can also be designated as cylinder surface and is to be differentiated from the base surfaces of the resulting cylinder. The guide curve can have any desired form, preferably an inherently closed from, or also an open form.

In preferred embodiments of the method according to the invention, provision is made that the grinding channel is so formed that the final outer contour of the dental object to be produced extends completely within or at most in some sections along the outer contour of the preform. In other words, in these embodiments, provision is made that the final outer contour protrudes nowhere beyond the outer contour. This preferably applies when looked at both in a two-dimensional and also in a three-dimensional sense.

As regards the aforementioned lateral surface of a generalized cylinder, provision can be made that, seen in a section plane orthogonal to the lateral surface, a parallel projection of the final outer contour of the dental object to be produced into this section plane lies on or within the section line of the outer contour of the preform with the section plane. The projecting rays of the parallel projections are expediently oriented parallel to a direction of longitudinal extent, wherein, in this direction of longitudinal extent, the grinding tool is elongate or elongately oriented during the grinding process.

There are various possible ways of machining the grinding channel into the blank or into the pre-preform. Preferably, the grinding tool is in any case an article which is elongate in a direction of longitudinal extent and which has a surface that is preferably at least substantially rotationally symmetrical with respect to its longitudinal axis and carries the abrasive particles or the multiplicity of geometrically undefined cutting edges. This surface can be configured, for example, as a cylinder shell, in particular a circular cylinder shell, but it can also be conical or of another shape.

It is at any rate possible for the movement of the grinding tool during the machining of the grinding channel into the blank or into the pre-preform to be realized as a superpositioning of a rotation of the grinding tool about its longitudinal axis and an advance movement along the longitudinal direction of the grinding channel. In these embodiments, the width of the grinding channel thus produced corresponds substantially to the width of the grinding tool or is only slightly larger.

However, in other embodiments, the movement of the grinding tool during the machining of the grinding channel into the blank or into the pre-preform can also be a superpositioning of three movements. Thus, in these embodiments, this can involve a superpositioning of a rotation of the grinding tool about its longitudinal axis and an advance movement along a longitudinal direction of the grinding channel and a movement of the grinding tool with its longitudinal axis with at least one movement component orthogonal to the longitudinal direction of the grinding channel. It will be noted here that both the advance movement in the longitudinal direction of the grinding channel and the movement component orthogonal to the longitudinal direction of the grinding channel ultimately amount in each case merely to a relative movement between the blank or pre-preform, on the one hand, and the grinding tool, on the other hand. When carrying out the method according to the invention, it is possible to choose freely whether only the grinding tool is moved or only the blank or pre-preform is moved, or whether both are moved.

It will also be noted that the longitudinal direction of the grinding channel does not necessarily have to be straight or linear. The grinding channel can be completely straight or curved or can be bent in some sections or curved in some sections, etc. The longitudinal direction of the grinding channel is ultimately the direction along the grinding channel.

The movement component orthogonal to the longitudinal direction of the grinding channel can take place through movement of the grinding tool with its longitudinal axis on closed movement paths, e.g. a circular path, an elliptical path or a rectangular path. In these embodiments, the expression gyratory grinding or trochoidal grinding could also be used.

In principle, the method according to the invention can also be carried out with grinding devices in which the movements of the grinding tool and of the blank or pre-preform, and the relative movements ultimately to be performed, are controlled manually in order to machine the grinding channel into the blank or the pre-preform. Particularly preferably, however, methods according to the invention are carried out by computer-controlled grinding devices or are at least partially automated. Grinding devices suitable in principle both for manual control and for computer control are known in the prior art and therefore do not need to be discussed in any further detail.

Besides the method according to the invention, the invention also relates to a computer program for controlling a grinding device, which computer program is programmed for the production of a dental object by a method according to the invention. In other words, it is a computer program which is intended and set up to carry out the method according to the invention by a grinding device. Again in other words, the computer program is programmed and configured such that it is able to control a grinding device such that the method according to the invention is carried out with this grinding device.

BRIEF DESCRIPTION OF THE DRAWINGS

Further features and details of preferred embodiments of the invention will become clear from the following description of the figures, in which.

DETAILED DESCRIPTION

Figure 1:
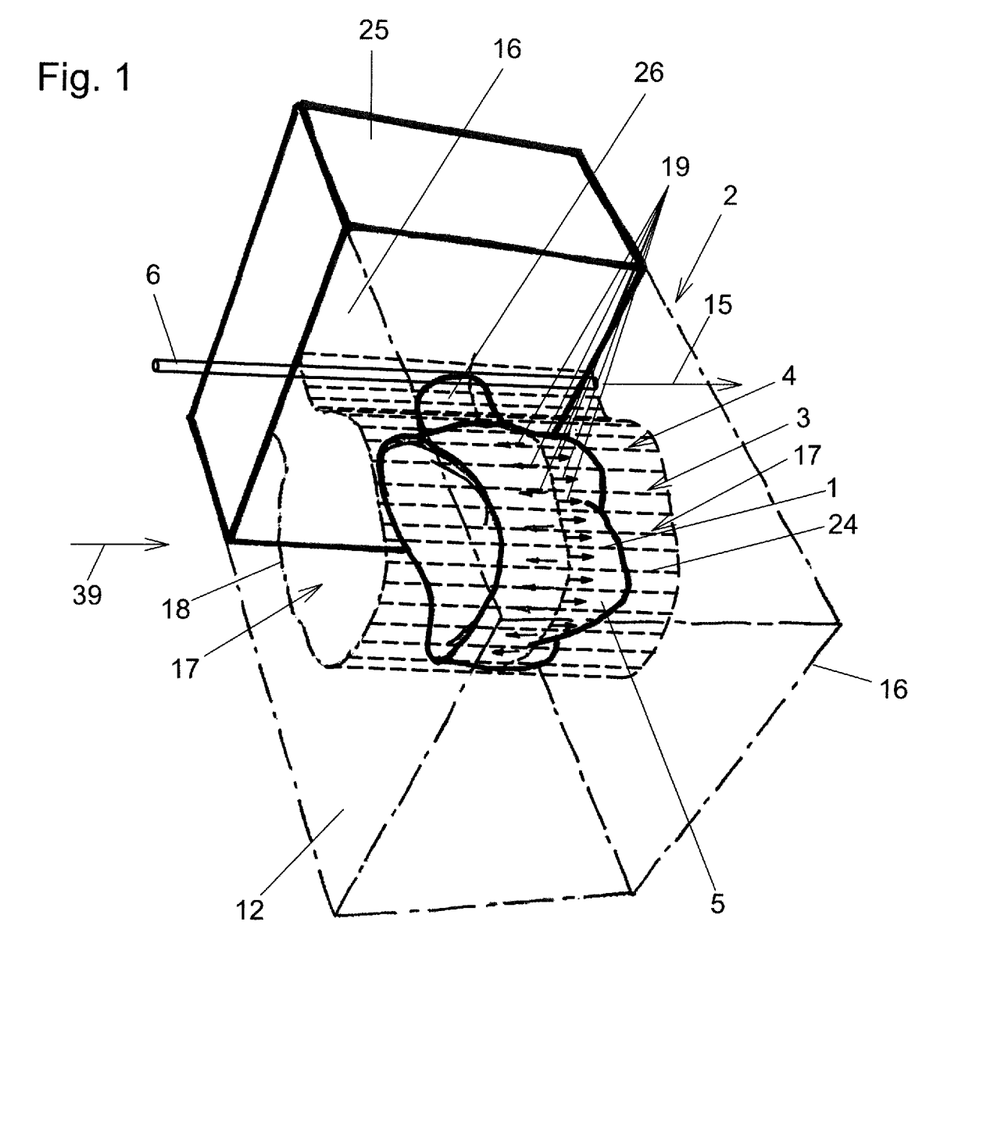
FIG. 1 shows a partially transparent view of a blank and, indicated therein, the dental object that is to be produced and the preform.

FIG. 1 first of all shows a blank which is made of ceramic or of a ceramic-plastic composite material and which is of a cuboid shape in the example shown here, from which blank the dental object 1 is intended to be machined by grinding. In the illustrative embodiment shown here, the dental object 1 is a dental prosthesis in the form of an artificial tooth. The latter has the final outer contour 5. Outer contour 4 and final outer contour 5 each designate the outer surfaces of the respectively mentioned bodies. In the region in which dental object 1 has to be machined, the blank 2 is shown in transparent form in FIG. 1. In a manner known per se, the dental object 1 to be machined is connected by the support web 26 to a base region 25 of the blank 2. The base region 25 can be removed at a given time by separation of the support web 26.

Figure 4:
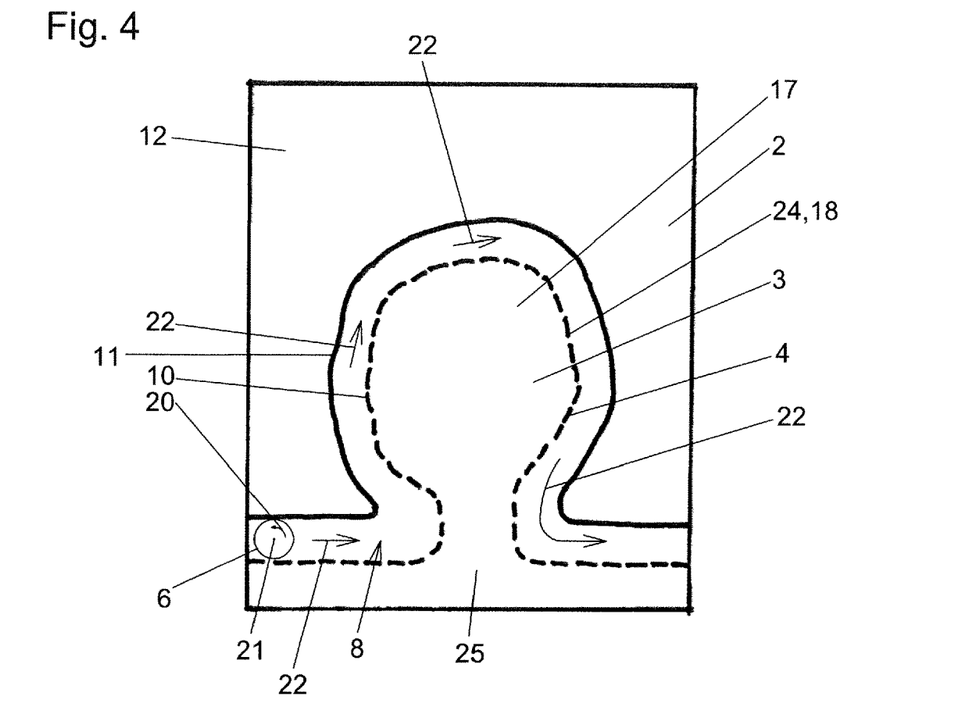
FIG. 4 shows a side view of the blank, with the preform indicated therein and with the grinding channel indicated therein.

In the prior art, all the regions of the blank 2 that do not ultimately form the dental object 1, the support web 26 or the base region 25 are converted to grinding dust by the grinding work. By contrast, in the invention, for the production of a preform 3 having an outer contour 4 that differs from the final outer contour 5 of the dental object 1 to be produced, the grinding channel 8, shown in a side view in FIG. 4, is machined into the blank 2 in at least one grinding process using the grinding tool 6 of the grinding device 7. The outer contour 4 of the preform 3 is formed at the edge 10 of the grinding channel 8. On the edge 11 of the grinding channel 8 opposite the outer contour 4 of the preform 3, the residual piece 12 is separated from the blank 2. In this way, a substantially smaller volume has to be machined from the blank 2, namely only the volume of the grinding channel 8. This saves time and reduces the wear on the grinding tool 6.

Figure 2:
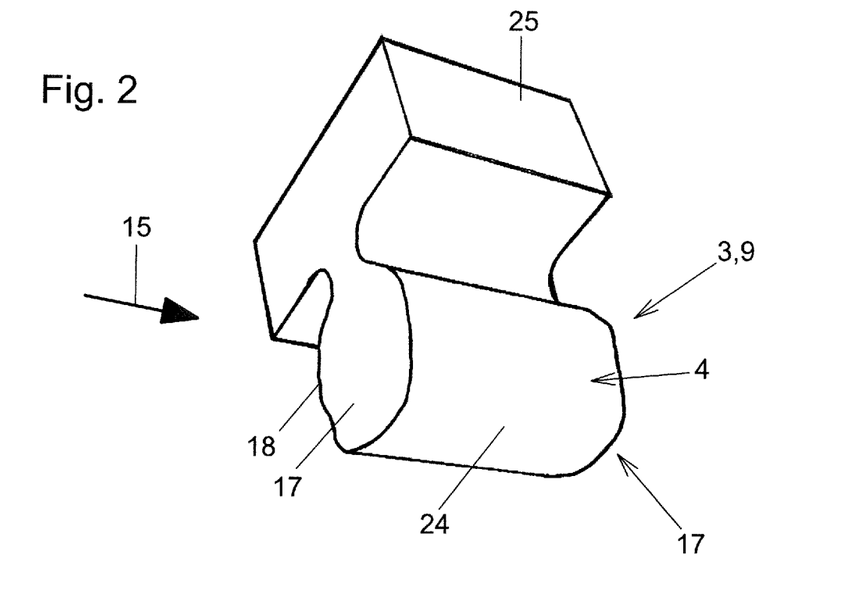
FIG. 2 shows only the preform from FIG. 1.

In the illustrative embodiment shown, as depicted in FIGS. 1 and 2, the outer contour 4 of the preform 3, which differs from the final outer contour 5 of the dental object 1, is formed by the lateral surface 24 of a generalized cylinder and the two base surfaces of this generalized cylinder. In FIGS. 1 and 2, the base surfaces of this generalized cylinder are parallel projections 17 of the final outer contour 5 of the dental object 1 in section planes 16. These section planes 16 are orthogonal to the lateral surface 24. For the sake of completeness, it will be noted here that a parallel projection is a representation of points of a three-dimensional space, here in particular of the three-dimensional dental object 1, on points of a given plane, here the section plane 16, wherein the projecting rays 19 shown in FIG. 1 are parallel to each other. The parallel projections 17 thus generated are indicated in FIG. 1; they could also be designated as parallel projection surfaces. In the section planes 6 shown, these parallel projections 17 are limited by the section lines 18. In FIGS. 1 and 2, the section lines 18 are the section lines of the outer contour 4 of the preform 3 with the respective section plane 16. The lateral surface 24, which forms a subregion of the whole outer contour 4 of the preform 3 according to FIGS. 1 and 2, arises through parallel displacement of a straight line along the section line 18. In the mathematical sense, the section line 18 thus forms the guide curve for this parallel displacement. The parallel-displaced straight line or generatrix lies parallel to the direction of longitudinal extent 15 of the here pin-shaped grinding tool 6. In FIGS. 1 and 2, the parallel projection 17 is thus limited by the section line 18 of the outer contour 4 of the preform 3 with the section plane 16. According to the invention, however, provision can also be made that the parallel projection 17 lies within a region framed by the section line 18. Such an illustrative embodiment is explained in more detail below with the reference to FIG. 5. It is in any case expedient if the final outer contour 5 of the dental object 1 to be produced extends completely within or at most in sections along the outer contour 4 of the preform 3. This is the case in the illustrative embodiment according to FIGS. 1 and 2. FIG. 2 shows the outer contour 24 of the preform 4 formed by machining the grinding channel 8 using the grinding tool 6, which outer contour results from the sum of the lateral surface 24, the generalized cylinder and the parallel projections 17 in the respective section planes 16, as are shown in FIG. 1. By the machining of the grinding channel 8 into the blank 2 in the manner according to the invention, the residual piece 12 (no longer shown in FIG. 2) was separated from the blank 2. In the grinding process for producing the grinding channel 8, the grinding tool 6 was arranged exclusively with its longitudinal extent 15 in orientations arranged parallel to each other. One of the directions of longitudinal extent 15 is indicated schematically as an arrow in FIG. 2. Put simply, during the milling of the grinding channel to form the outer contour 4 or the lateral surface 24 of the preform 3, the grinding tool 6 shown in FIG. 1 was thus always guided in positions parallel to the arrow 15 in FIG. 2.

As has already been mentioned, the outer contour 4 of the preform 3 differs both from the outer contour of the original blank 2 and also from the final outer contour 5 of the dental object 1 to be produced. The outer contour 4 of the preform 3 is in most cases an approximation to the final outer contour 5 of the dental object 1, but one which still has to be further ground down in order to generate the final outer contour 5 of the dental object 1.

Figure 3:
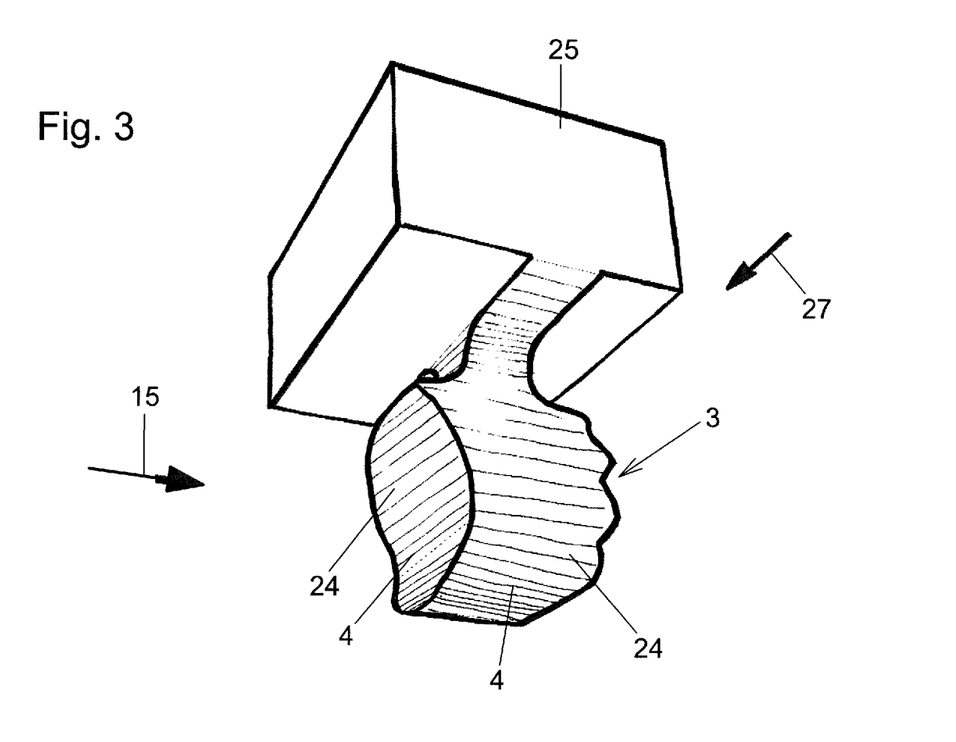
FIG. 3 shows a further preform.

To achieve this, the preform 3 according to FIG. 2 can now be ground down in a manner known per se, such that the final outer contour 5 of the dental object 1 is finally obtained. However, it is also possible to use the preform 3 according to FIG. 3 as a pre-preform 9 and thus as a starting point for further use of the method according to the invention, in order thereby to approximate still further to the final outer contour 5 of the dental object 1. For this purpose, a second grinding channel 8 can for example be ground into the preform 3 according to FIG. 3 now used as a pre-preform 9. In this way, a further residual piece 12 (not shown here) is separated from the preform 3 according to FIG. 2. The end result of this further use of the method according to the invention is shown in FIG. 3. In terms of its outer contour 4, the preform 3 according to FIG. 3, now generated from the preform 3 according to FIG. 2 used as pre-preform 9, is more closely approximate than the preform of FIG. 2 to the final outer contour 5 of the dental object 1 according to FIG. 1. However, as before, it is still not identical thereto. The final outer contour of the dental object 1, however, still lies completely within or at most in sections on the outer contour 4 of the preform 3 according to FIG. 3. During the machining of the grinding channel 8 (not shown explicitly here) into the pre-preform 9 according to FIG. 2, the direction of longitudinal extent of the grinding tool 6 was at all times kept parallel to the direction indicated by the arrow 27 in FIG. 3. In the illustrative embodiment shown, this direction 27 is orthogonal to the direction which is symbolized by the arrow 15 in FIG. 3 and which is also shown in FIG. 2. It is therefore parallel to the directions of longitudinal extent 15 in which the grinding tool 6 was held in order to generate the first grinding channel 8 for working the preform 3 according to FIG. 2. Of course, these directions 15 and 27 do not necessarily have to be orthogonal to each other in succeeding iterative applications of the method according to the invention.

FIG. 4 now shows a schematic view of the profile of the grinding channel 8 which has been machined into the blank 2 in order to produce the preform 3 according to FIGS. 1 and 2. FIG. 4 is a side view, from the direction 39, of the situation according to FIG. 1. Through this use of the method, the residual piece 12 is separated from the blank 2 by the grinding channel 8. What is left is the preform 3 with its outer contour 4. During the machining of the grinding channel 8, the edge 10 of the grinding channel 8 forms the outer contour 4 of the preform. At the opposite edge 11 of the grinding channel 8, the residual piece 12 is separated from the blank 2. The edge 10 of the grinding channel 8 thus forms the lateral surface 24 of the preform 3, here configured as a generalized cylinder. In FIG. 4, the projections 17, which could also be designated as projection surfaces, form the base surfaces of the cylinder. The longitudinal direction 22 of the grinding channel 8 to be machined into the blank 2 is indicated in FIG. 4. As has been stated above, it does not have to be linear or straight.

Figure 5:
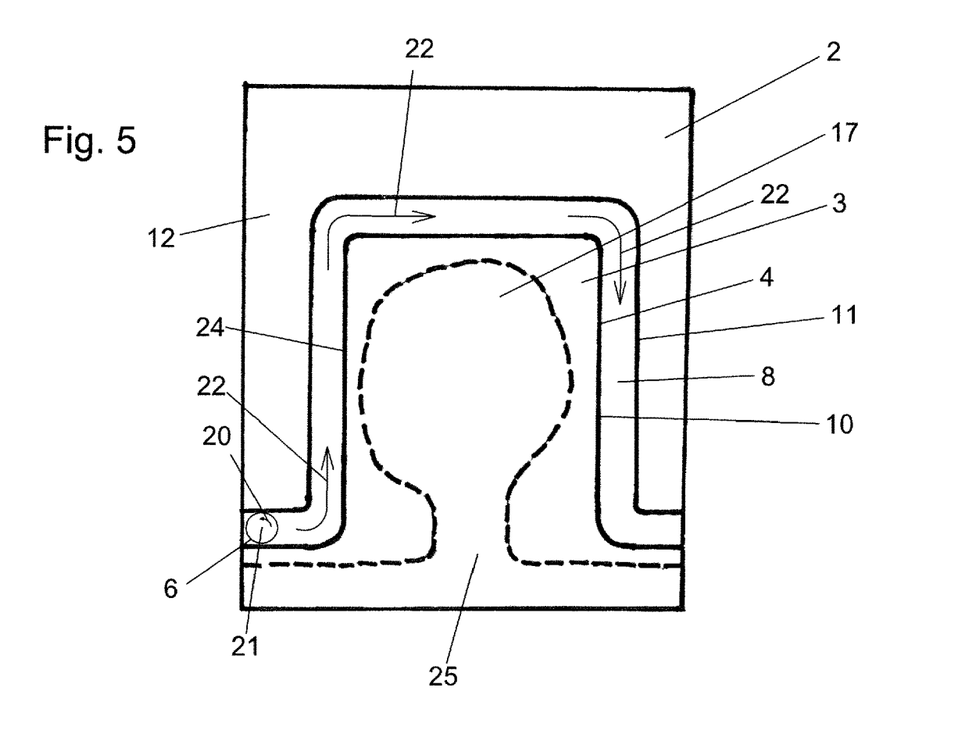
FIG. 5 shows, in a view similar to FIG. 4, an alternative embodiment of a preform.

FIG. 5 shows, by way of example, that the outer contour 4 of the preform 3 does not necessarily have to be created on the basis of a parallel projection 17 of the final outer contour 5 of the dental object 1 ultimately to be produced. It suffices if the final outer contour 5 of the dental object 1 to be produced extends completely within or at most in sections along the outer contour 4 of the preform 3. In this sense, in the variant according to FIG. 5, the machining of a corresponding grinding channel 8 generates an outer contour 4 of the preform 3 into which the final outer contour 5 and therefore also the parallel projection 17 of the dental object 1 fits, without there already being any great similarity in shape between the outer contour 4 of the preform 3 and the final outer contour 5 of the dental object 1 ultimately to be produced. Moreover, in the variant according to FIG. 5, the effect achieved according to the invention is that a residual piece 12 is separated from the blank 2 by means of the grinding channel 8. Moreover, in the variant according to FIG. 5, the final outer contour 5 of the dental object 1 can then be ground from the preform 3 with substantially less effort. This can in turn be achieved through iterative application of the method according to the invention or by direct machining of the final outer contour 5 into the preform 3.

Figure 12:
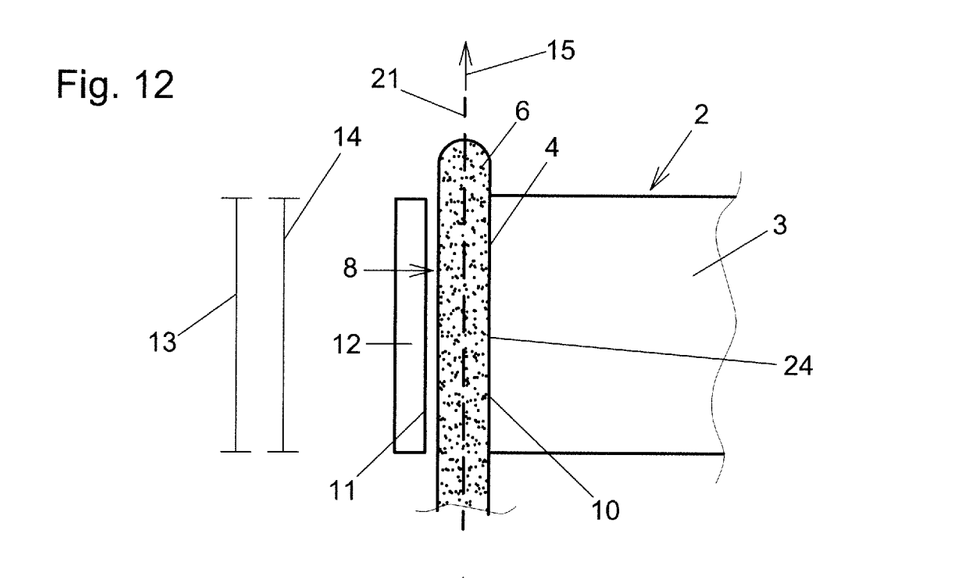
FIG. 12 shows a schematic view of the production of the grinding channel in a grinding process.
Figure 13:
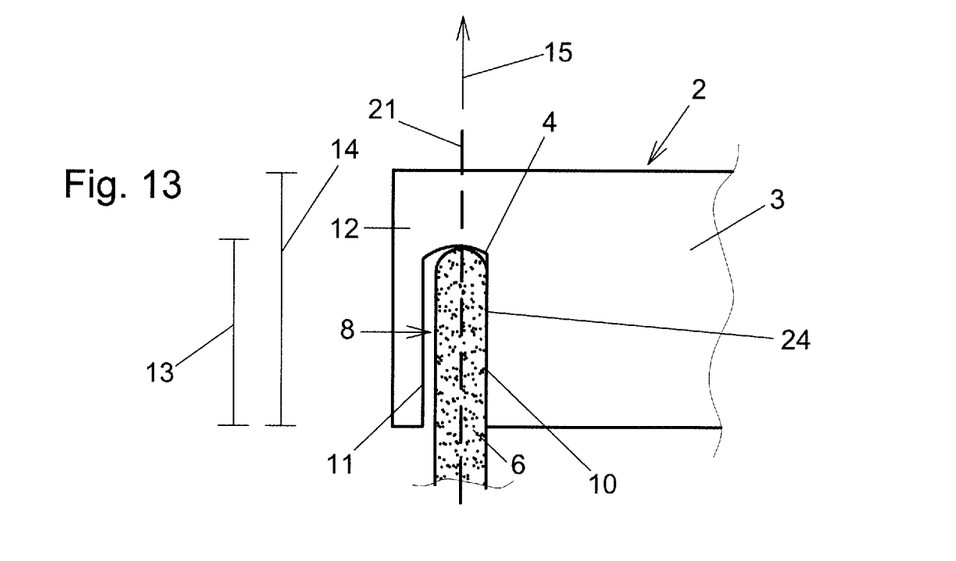
FIG. 13 shows a schematic view of the production of a grinding channel in at least two grinding processes.

A common feature of the variants in FIG. 4 and FIG. 5 is that here, as in other preferred embodiments of the invention, provision is made that the mutually opposite edges 10 and 11 of the grinding channel 8, in the regions where both opposite edges 10 and 11 of the grinding channel 8 are formed, are at a constant distance from each other over the entire profile of the grinding channel 8, in the longitudinal direction 22 of the grinding channel 8. For side views, as are shown in FIGS. 4 and 5, this preferably applies from direction 39 to the situation according to FIG. 1, i.e. from a direction parallel to the direction of longitudinal extent 15 of the grinding tool 6. In the direction of the penetration depth 13 of the grinding tool 6, as shown in FIGS. 12 and 13, the distance between the walls forming the edges 10 and 11 of the grinding channel 8 can be constant or can vary. For example, if a grinding tool 6 is used that has the shape of a circular cylindrical surface, these walls forming the edges 10 and 11 of the grinding channel 8 can be parallel to each other, as can be seen in FIGS. 12 and 13. Viewed in the direction of the penetration depth 13 of the grinding tool 6, they then have a constant distance from each other. By contrast, if a grinding tool 6 with a conical lateral surface is used, this can have the effect that the walls of the grinding channel 8 forming the edges 10 and 11 do not have a constant distance from each other when viewed in the direction of the penetration depth 13 of the grinding tool 6, and instead, for example, they taper toward each other. However, in these last-mentioned embodiments too, provision is preferably made that the mutually opposite edges 10 and 11 of the grinding channel 8, in the regions where both opposite edges 10 and 11 of the grinding channel 8 are formed, are at a constant distance from each other over the entire profile of the grinding channel 8, in the longitudinal direction 22 of the grinding channel 8.

FIGS. 6 to 11 now show a number of variants of how the machining of the grinding channels 8 into the blank 2 or the pre-preform 9 can proceed. For this purpose, an elongate, pin-shaped grinding tool 6 is preferably used in each case, as is shown in FIG. 1 but also in FIGS. 12 and 13. A large number of abrasive particles, for example, can be arranged on the outer surface and in particular on the lateral surface of this grinding tool 6 in order to form the geometrically undefined cutting edges needed for the grinding.

Figure 6:
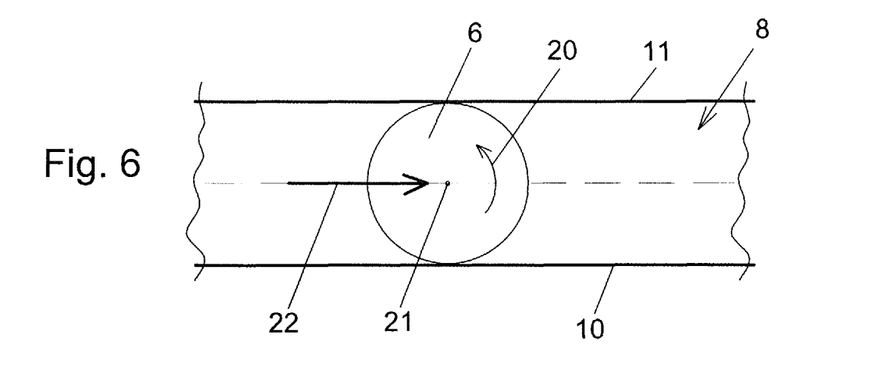
FIG. 6 shows a view of a first possibility of machining a grinding channel.
Figure 7:
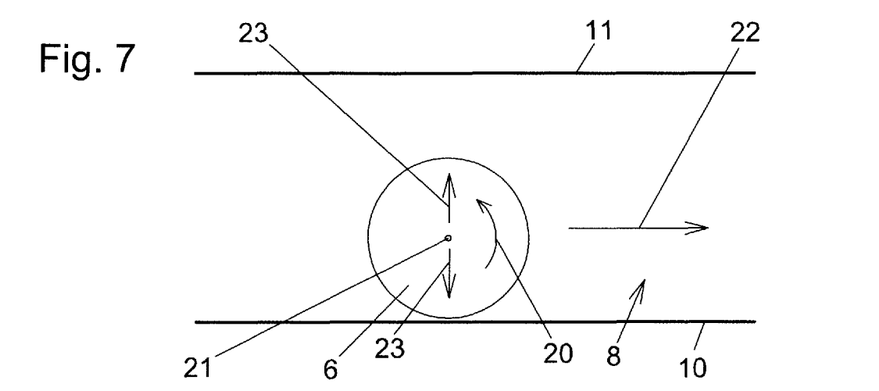
FIGS. 7 to 11 show schematic views of further possibilities of machining a grinding channel.
Figure 11:
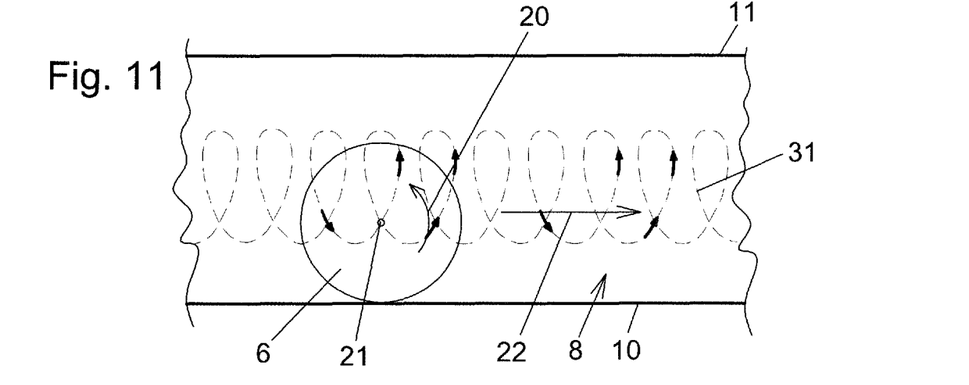

FIGS. 6, 7 and 11 each show a plan view of the grinding channel 8. As regards the grinding tools 6, only a schematized circular cross section thereof, perpendicular to the direction of longitudinal extent 15, is shown in each plan view.

In the variant according to FIG. 6, the movement of the grinding tool 6 during the machining of the grinding channel 8 into the blank 2 or into the pre-preform 9 is a superpositioning of two movements. These are, on the one hand, the rotation 20 of the grinding tool 6 about its longitudinal axis 21, wherein the longitudinal axis 21 runs in the direction of longitudinal extent 15. In the variant according to FIG. 6, this rotation 20 is superposed by an advance movement, which takes place along the longitudinal direction 22 of the grinding channel 8. In this procedure, the width of the grinding channel 8, i.e. the distance between its edges 10 and 11, is substantially the same as or only slightly greater than the diameter of the grinding tool 6. The advance movement in the longitudinal direction 22 of the grinding channel 8 arises from a relative movement between grinding tool 6 and blank 2 or pre-preform 9. It is ultimately of secondary importance whether the grinding tool 6 or the blank 2 or pre-preform 9 are moved, or both movements are carried out, in order to generate this relative movement.

Figures 8, 9:
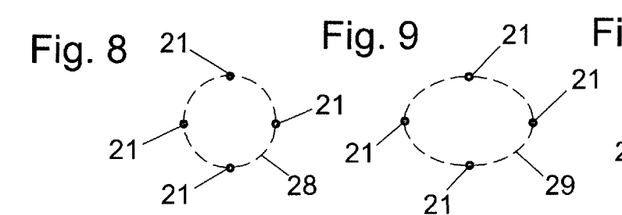
Figure 10:
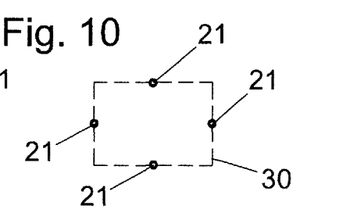

FIGS. 7 to 11 serve to illustrate a variant in which the movement of the grinding tool 6 during the machining of the grinding channel 8 into the blank 2 or into the pre-preform 9 is a superpositioning of three movements. In FIGS. 7 to 11, in addition to the two movement forms of rotation 20 and of advance in the longitudinal direction 22 of the grinding channel 8, there is also superpositioning with a movement of the grinding tool 6 by means of its longitudinal axis 21 with at least one movement component 23 orthogonal to the longitudinal direction 22 of the grinding channel 8. In this way, a grinding channel 8 is generated with a width, i.e. a distance between the edges 10 and 11, which is generally much greater than the diameter of the grinding tool 6. This procedure could also be referred to as gyratory grinding. Surprisingly, in this type of grinding, a more rapid forward movement is achieved with lower wear of the grinding tool 6. In preferred embodiments, the additional movement with a movement component 23 orthogonal to the longitudinal direction 22 leads on its own to a movement of the longitudinal axis 21 of the grinding tool 6 on an inherently closed path. Examples of such closed paths that can be obtained are shown schematically in FIGS. 8 to 10. The longitudinal axis 21 of the grinding tool 6 is guided on a circular path 28 in FIG. 8, on an elliptical path 29 in FIG. 9, and on a rectangular path in FIG. 10. Other path shapes are also possible. For the sake of clarity, FIGS. 8 to 10 show the longitudinal axes 21 of the grinding tool 6 only at randomly selected positions along the respective paths 28, 29 and 30.

When the superpositioning of these three movements is realized with a movement of the longitudinal axis 21 on a circular path according to FIG. 8, then, if the movement of the longitudinal axis 21 is traced, this results overall in a trochoidal path 31 in the form of an extended cycloid. This is shown schematically in FIG. 11. In this embodiment, the gyratory grinding could also be referred to as trochoidal grinding.

As has already been stated at the outset, provision is preferably made that the grinding channel 8 is machined into the blank 2 or the pre-preform 9 in a single grinding process and that the residual piece 12 or the residual pieces 12 is/are separated, preferably completely, from the blank 2 or from the pre-preform 9 in this single grinding process. For this purpose, the penetration depth 13 of the grinding tool 6 into the blank 2 or into the pre-preform 9 during the machining of the grinding channel is set such that the grinding channel 8 is formed to its full depth 14 in a single grinding process. This is shown by way of example in FIG. 12. The grinding tool 6 penetrates the blank 2 to its full depth 14. In FIG. 12, the grinding tool 6 even protrudes slightly on both sides from the blank 2.

Alternatively, however, provision can also be made that several grinding processes are needed in order to form the grinding channel 8 to its full depth 14. The number of grinding processes is, however, also limited to a small number, preferably at most five grinding processes. FIG. 13 shows an example of an embodiment in which two grinding processes are needed in order to form the grinding channel 8 to its full depth 14, in order then to completely separate the residual piece 12 from the rest of the blank 2. FIG. 13 shows by way of example the penetration depth 13 in the first grinding process. Since the penetration depth 13 of the grinding tool 6 in FIG. 13 is less than the full depth 14, the remaining part of the grinding channel 8 has to be ground out in a second grinding process. For this purpose, for example, the blank 2 can be rotated through 180°, so that the grinding tool 6 can then finish the grinding channel 8 from the other side. However, it is equally possible for the second grinding process to be carried out from the same side as in the situation according to FIG. 13 if the penetration depth 13 of the grinding tool 6 is then accordingly adjusted such that the full depth 14 is reached. It should also be noted that, after the grinding channel 8 has been finished to its depth according to FIG. 13, this grinding channel 8 could also be used as a predetermined breaking point in order to break off the residual piece 12 from the blank 3. Of course, the points made here also apply to the machining of a grinding channel 8 into a pre-preform 9.

Figure 14:
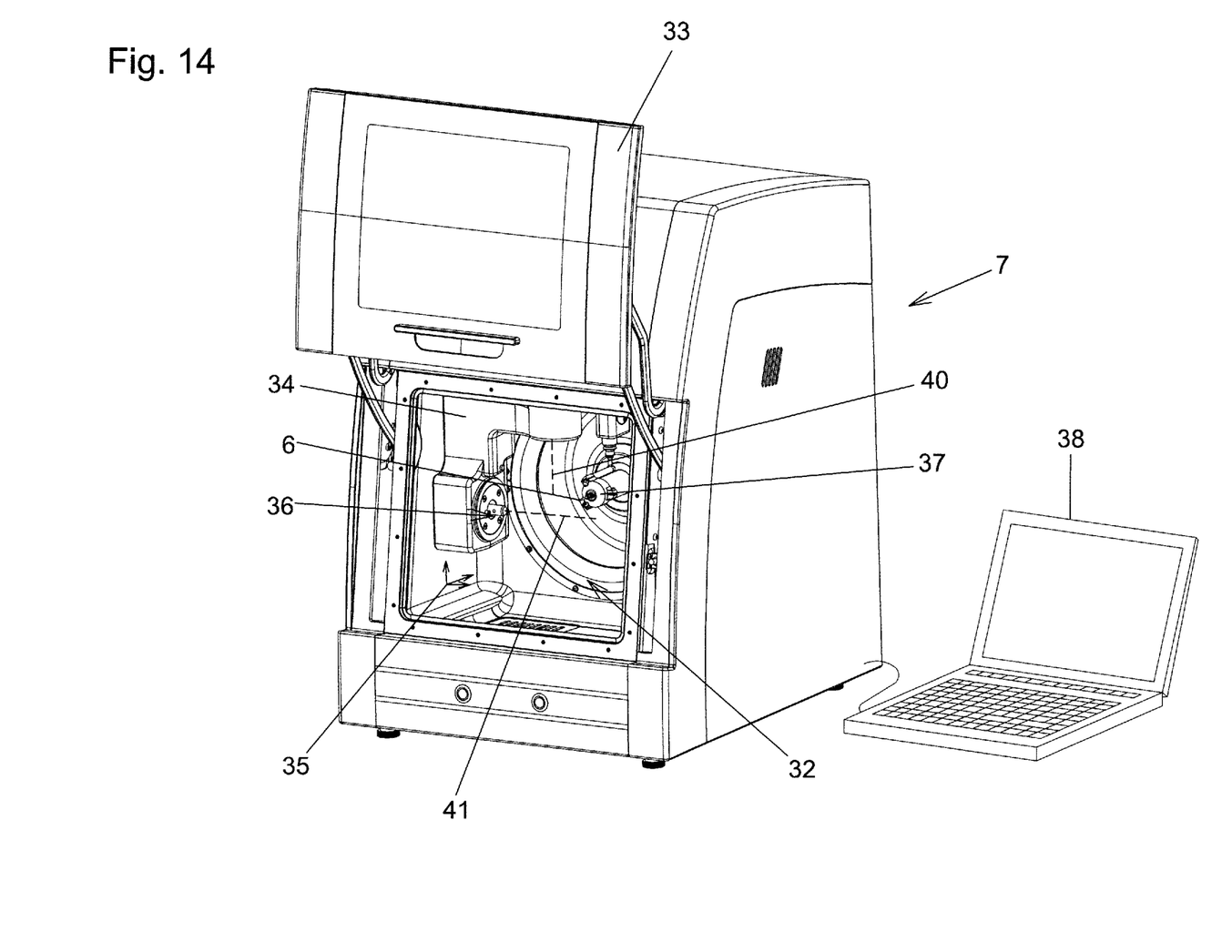
FIG. 14 shows a view of a computer-controlled grinding device for implementing the method according to the invention.

FIG. 14 now shows a schematic view of an example of a grinding device 7 controlled by a control computer 38, i.e. a computer-controlled grinding device 7, with which the method according to the invention can be carried out. The grinding device 7 comprises the grinding tool 6, which can be held in the tool carrier 37 and can be rotated about its longitudinal axis in order to generate the rotation 20. Preferably, the grinding tool 6 and tool carrier 37 can also be additionally moved in the movement directions 35 in the machining cavity 32 of the grinding device 7. The blank 2 (not shown here) or a pre-preform 9 is secured on the blank holder 36 of a support arm 34. In preferred embodiments, the support arm 34 can be pivoted about the pivot axis 40. The blank 2 or the pre-preform 9 on the blank holder 36 can preferably be pivoted about the pivot axis 41. The pivot axes 40 and 41 are preferably orthogonal to each other. With such grinding devices 7 known per se, it is possible to carry out both wet grinding and dry grinding methods. The machining cavity 32 can expediently be closed by means of the flap 33 in order to prevent the escape of dust and/or moisture during the grinding process. The control of the grinding device 7 can in principle take place manually. However, the control, hence the implementation of the method according to the invention using the grinding device 7, is preferably effected via the control computer 38, as is also indicated in FIG. 14. To be able to carry out the method according to the invention, the control computer 38 expediently runs the computer program according to the invention, which controls the grinding device 7 such that, by use of the grinding device 7, the dental object 1 can be produced by implementation of the method according to the invention.

KEY TO THE REFERENCE NUMBERS

1 dental object
2 blank
3 preform
4 outer contour
5 final outer contour
6 grinding tool
7 grinding device
8 grinding channel
9 pre-preform
10 edge
11 edge
12 residual piece
13 penetration depth
14 full depth
15 direction of longitudinal extent
16 section plane
17 parallel projection
18 section line
19 projecting rays
20 rotation
21 longitudinal axis
22 longitudinal direction
23 movement component
24 lateral surface
25 base region
26 support web
27 arrow
28 circular path
29 elliptical path
30 rectangular path
31 trochoidal path
32 machining cavity
33 flap
34 support arm
35 direction of movement
36 blank holder
37 tool carrier
38 control computer
39 direction
40 pivot axis
41 pivot axis

The invention claimed is:

1. A method for producing a three-dimensionally contoured dental object by grinding a blank made of ceramic or of a ceramic-plastic composite material, the method comprising:
    producing a preform having an outer contour that differs from a final outer contour of the dental object to be produced by machining a grinding channel into the blank, or into a pre-preform already worked from the blank, in at least one grinding process using a grinding tool of a grinding device,
    moving the grinding tool during the machining of the grinding channel into the blank or into the pre-preform in a superpositioning of a rotation of the grinding tool about a longitudinal axis thereof and an advance movement comprising a first movement component along a longitudinal direction of the grinding channel and a simultaneous second movement component of the grinding tool orthogonal to the longitudinal direction of the grinding channel creating a further movement of the grinding tool on an inherently closed path in conjunction with the first movement component,
    forming the outer contour of the preform with the grinding channel on one edge thereof, and,
    on an edge of the grinding channel opposite the outer contour of the preform, separating at least one residual piece from the blank or from the pre-preform at least in sections.

2. The method as claimed in claim 1, wherein a penetration depth of the grinding tool into the blank or into the pre-preform during the machining of the grinding channel is set such that the grinding channel is formed to a full depth in a single grinding process or in at most five grinding processes.

3. The method as claimed in claim 1, further comprising, after the production of the preform, producing the final outer contour of the dental object to be produced at least by further grinding of the preform.

4. The method as claimed in claim 1, wherein the grinding tool is elongate in a direction of longitudinal extent and the method further comprises, during the entire grinding process for production of the grinding channel or during all of the grinding processes for production of the grinding channel, arranging the grinding tool exclusively with a direction of longitudinal extent thereof in orientations arranged parallel to each other.

5. The method as claimed in claim 1, wherein the final outer contour of the dental object to be produced extends completely within or at most in some sections along the outer contour of the preform.

6. The method as claimed in claim 1, wherein the outer contour of the preform is, at least in sections, a lateral surface of a generalized cylinder.

7. The method as claimed in claim 6, wherein, when viewed in a section plane orthogonal to the lateral surface, a parallel projection of the final outer contour of the dental object to be produced into said section plane lies on or within a section of the outer contour of the preform with the section plane.

8. The method as claimed in claim 7, wherein projecting rays of the parallel projection are oriented parallel to a direction of longitudinal extent in which the grinding tool is elongate during the grinding process.

9. The method as claimed in claim 1, further comprising moving the grinding tool during the machining of the grinding channel into the blank or into the pre-preform in a superpositioning of a rotation of the grinding tool about longitudinal axis thereof and an advance movement along a longitudinal direction of the grinding channel.

10. A grinding device including a computer controller configured to control a grinding tool of the grinding device, the computer controller being configured using a computer program for the production of a dental object using the method according to claim 1.

11. The method as claimed in claim 1, further comprising, after the production of the preform, producing the final outer contour of the dental object to be produced exclusively by further grinding of the preform.

* * * * *